July 15, 1969  R. H. WOLTERS  3,455,456
RETRACTABLE PIN LINT FILTER
Filed Jan. 26, 1968  2 Sheets-Sheet 2

INVENTOR.
Richard H. Wolters
BY
Frederick M. Ritchie
ATTORNEY

United States Patent Office 3,455,456
Patented July 15, 1969

3,455,456
RETRACTABLE PIN LINT FILTER
Richard H. Wolters, Grand Rapids, Mich., assignor to General Motors Corporation, Detroit, Mich., a corporation of Delaware
Filed Jan. 26, 1968, Ser. No. 700,906
Int. Cl. B01d 35/22, 35/16, 35/02
U.S. Cl. 210—143                 6 Claims

ABSTRACT OF THE DISCLOSURE

In the preferred form, a lint filter for a recirculating flow type domestic clothes washer having a plurality of pins located in a fluid conduit to strain lint from recirculating water flow, the pins being retractable from the fluid conduit through holes in a perforate plate member during a drainout operation of the clothes washer, so that during retraction, captured lint is mechanically stripped from the pins and can be flushed from the fluid conduit.

---

This invention relates to a recirculative type clothes washer and more particularly to an improved lint filter assembly having improved flushout characteristics.

One type of domestic clothes washer includes a perforated spin basket disposed within a fixed water container through which washing fluid or water is recirculated throughout the clothes washing cycle for removing lint and the like—a filter being provided in the path of the circulation for this purpose. Periodically during the clothes washing cycle recirculation of wash water is terminated and the dirty water is pumped to drain—the filter being backwashed in response to the drain operation. This invention is directed to an improved arrangement for filtering lint or the like from wash water during recirculation thereof in one direction and, in response to a change in the direction of circulation, for cleaning the filter.

Accordingly, it is an object of this invention to provide a lint filtering device for a recirculating type clothes washer.

Another object of this invention is the provision of an improved lint filtering device for a recirculating clothes washer wherein said lint filtering device is self-cleaning.

Another object of this invention is the provision of a lint filtering device having a retractable filter member offering little resistance to a reverse flow flushing circulation.

A still further object of this invention is the provision of a lint filtering device having a retractable filter member wherein lint collected on said filter member is stripped from said filter member during retraction of said filter member from a fluid flow path so as to leave the lint in the fluid flow path for flushing from said filter.

Another object of this invention is the provision of a lint filter having improved self-cleaning features utilizing both a mechanical stripping of lint from a filter member and a water or fluid flow flushing system.

Still another object of this invention is the provision of a lint filtering device having a filter member movable from a filtering position to a retracted position in response to a change in pressure in a fluid system utilizing the filtering device.

Further objects and advantages of the present invention will be apparent from the following description and reference to the accompanying drawings wherein a preferred embodiment of the present invention is clearly shown.

Figure 1:
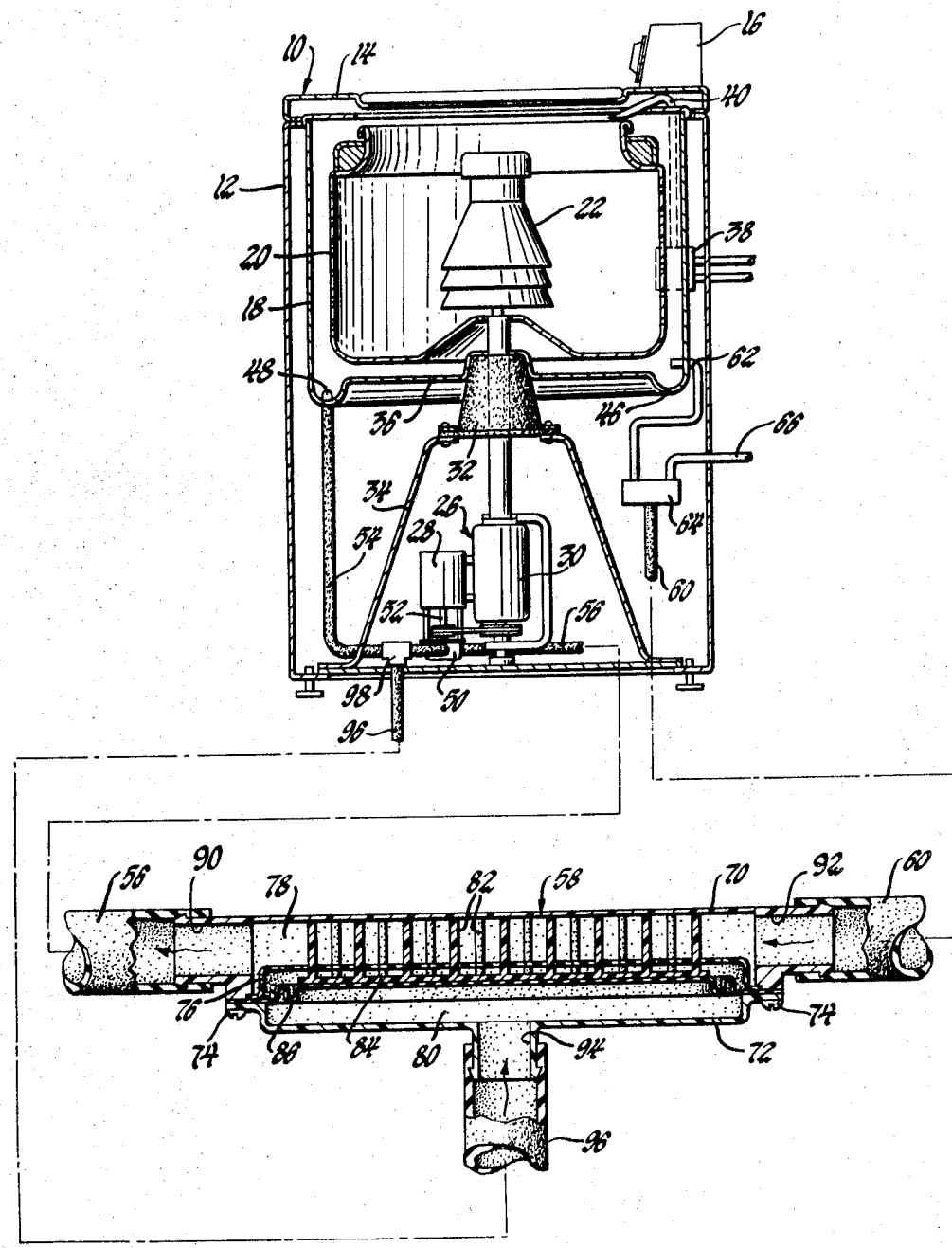
FIGURE 1 is a schematic drawing of a recirculation system for a washing machine, partly in elevation, including a vertical sectional view of the washing machine and an enlarged vertical sectional view of a lint filter assembly disposed in the recirculating flow system.
Figure 2:
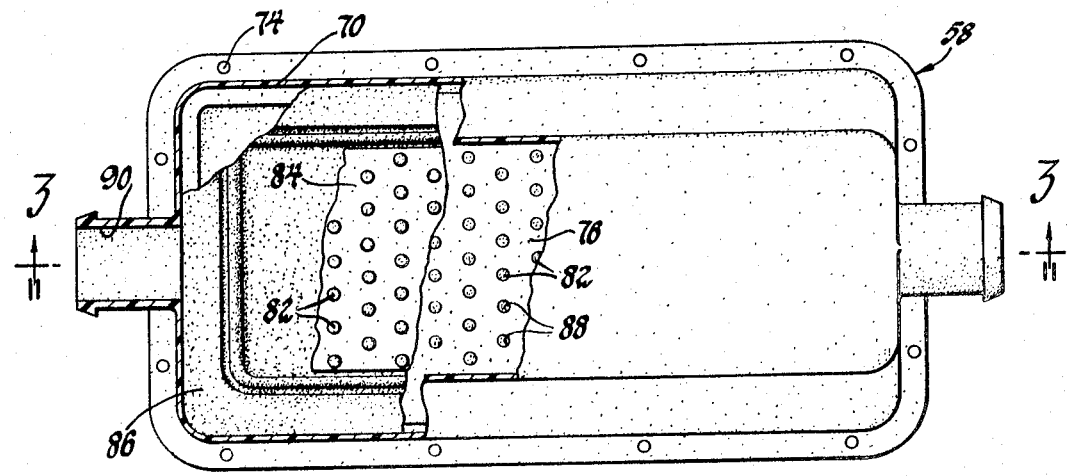
FIGURE 2 is a horizontal sectional view, with parts broken away, of the improved lint filtering assembly of this invention.

In accordance with this invention and with reference to FIGURE 1, a recirculating type clothes washer 10 is illustrated and may be of the type taught in the patent to Brubaker 3,305,093, issued Feb. 21, 1967. The clothes washer 10 is provided with a casing 12 having a top wall 14 thereof including a control housing or console 16. The casing 12 encloses a stationary water container 18 to which a perforated spin basket 20 is rotatably mounted. Within the spin basket 20 is an agitator 22, both the agitator 22 and the spin basket 20 being actuated through an agitating and spinning mechanism shown generally at 26. The mechanism 26 may be of the type taught in the patent to Sisson 2,758,685, issued Aug. 14, 1956, including a reversible motor 28 drivingly connected to a motion translating portion 30 which, when rotated in one direction, will cause the agitator 22 to reciprocate vertically, and which, when rotated in the opposite direction, will cause the spin basket 20 to rotate within the water container 18 to centrifuge the wash water from the clothes. The mechanism 26 is yieldably carried on a flexible hat-like member 32. This hat-like member is supported from the bottom of the casing by a support stand 34 and is connected at its top to the bottom wall 36 in the water container 18. An initial flow of wash water is provided by a conventional flow valve arrangement 38 which includes a conduit 40 leading to the top opening of the spin basket. A common level of water will exist in the water container 18 and in the perforated spin basket 20.

The bottom wall 36 of the water container 18 is provided with a downwardly spiraling or volute shaped channel 46 along the outer periphery thereof terminating in the water container outlet 48. The direction of swirl or spiral of the water container bottom is downwardly in the direction of spin from the basket 20. Thus when the tub 20 is spun to centrifuge water from the clothes therein, the swirl imparted to the centrifuging water will be accelerated by the downward spiral of the water container bottom, thereby to cause the water to be rammed into the drain outlet 48 from the water container. This prevents the water which is being pumped to drain from bypassing the drain outlet in the water container.

The clothes washer 10 is provided with a recirculating wash water system having a bidirectional fluid flow means which will now be described. A reversible pump 50 of conventional two-directional flow design is positioned on the lower end of a motor shaft 52 of the reversible motor 28. The pump is connected by means of a pump conduit 54 to the water container outlet 48 and by means of a pump conduit 56 to a lint filter assembly 58. A conduit 60 completes the circuit from the lint filter assembly 58 through a two-way valve 64 to a filter inlet fitting 62 in the lower side wall of the water container below the normal water level in the water container. Note that the take-off fitting 62 is disposed in the water container 18 on the opposite side thereof from the drain outlet 48. When the pump is operating in a recirculation direction this creates a diametrical sweep of the tub bottom from one side of the water container to the other as water enters the take-off fitting 62 and is returned by way of the lint filter assembly 58 and conduits 54, 56 to the tub opening 48. Lint and the like is thus swept into the filtering system. Whenever it is desired to direct the wash water to a drain line 66, the motor 28, and thus the pump 50, is reversed along with the two-way valve 64, thus providing water flow from the drain outlet 48 through the lint filter arrangement 58 and the valve 64 to the drain line 66.

The lint filter assembly 58 will now be described with reference to the enlarged sectional view of FIGURE 1 and FIGURES 2, 3 and 4. The lint filter assembly 58 is comprised of a two-part housing having an upper casing portion 70 and a lower casing portion 72 held together by fastening means such as screws 74. Also supported by the fastening means is a perforated plate 76 which divides the lint filter assembly into a filtering compartment 78 and a pressure or pressure sensing compartment 80. The assembly also contains a plurality of filtering pins 82 integrally molded to a pin carrying plate 84. The plate 84 is fastened to a flexible diaphragm 86 located in the pressure compartment 80. The flexible diaphragm 86 is in sealing engagement with the joined faces of the upper casing portion 70 and the lower casing portion 72. The perforated plate 76 has a plurality of openings 88. The pins 82 are located so as to be aligned with the openings 88 in the perforated plate 76. The pins 82 extend through the openings 88 in a close tolerance fit therewith so as to provide a stripping action of each pin by the peripheral edge of its respective opening as the pins are moved with respect to the perforated plate 76. This stripping action will be further described below.

Figure 3:
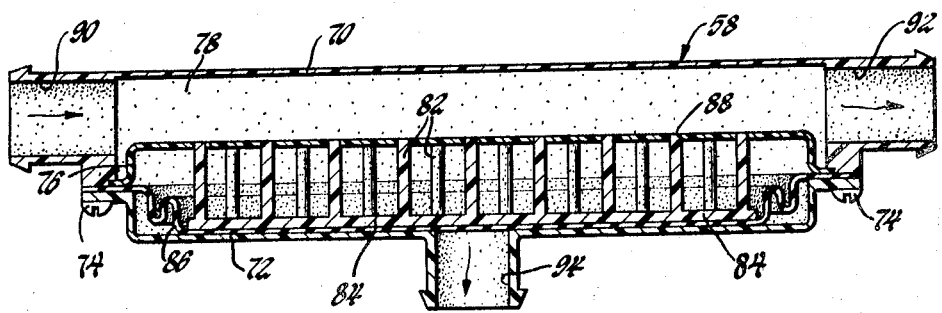
FIGURE 3 is a vertical sectional view taken along lines 3—3 of FIGURE 2 which shows the filter member of the present invention in a retracted position.
Figure 4:
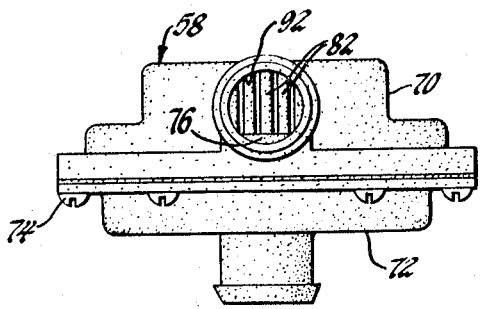
FIGURE 4 is an end elevational view of the lint filtering assembly.

The pins 82 are movable through the openings 88 of the perforated plate 76 into a first or filtering position as shown in the enlarged sectional view of FIGURE 1. The pins 82 may also be moved to a second or retracted position in the pressure compartment 80 as best shown in FIGURE 3. The upper casing portion 70 is also provided with an end opening 90 so that the filtering compartment 78 may be joined in fluid flow communication with the pump conduit 56. Similarly, the upper casing portion is provided with an end opening 92 to join the filtering compartment 78 in fluid flow communication with a filter conduit 60. The lower casing portion 72 of the assembly has an opening 94 to join the pressure compartment 80 in fluid flow communication with a pressure tap 98 by means of a pressure tap conduit 96. The pressure tap 98 is joined to the pump conduit 54 which is on the high pressure side of the reversible pump 50 during recirculation flow and the low pressure side of the pump 50 during drain-out flow.

The pins 82 are the filtering elements or members of the lint filter assembly. Although the pins 82 and the openings 88 of the perforated plate 76 are shown in the drawings to be round, the present invention is not limited to such an embodiment, the pins 82 and the openings 88 may be of any cross-sectional configuration including round, square or triangular. The close tolerance fit between the pins 82 and the openings 88 must be loose enough to provide reasonably free movement of the pins relative to the perforated plate 76. However, this fit must be close enough to provide a stripping coaction between the pins and the openings during movement of the pins 82 from a filtering position in the filtering compartment 78 to a retracted position in the pressure compartment 80. This stripping coaction loosens lint and like contaminants retained by the pins 82 in the filtering position so that the lint and the like is retained in the filtering compartment 78 after the pins have been retracted into the pressure compartment 80. Thus, further water flow through the filtering compartment 78 will flush the lint or foreign matter from the filtering compartment. Although this flushing water flow in the preferred embodiment moves in a direction reverse to the recirculation or filtering water flow, the flushing water flow could be in either direction with satisfactory results once the pins 82 have been moved to a retracted position. This in itself is an improvement over many lint filters which require that the self-cleaning or flushing flow be reverse to the filtering flow.

The following dimensions have been found suitable for the lint filter assembly in a water circulating system having a flow of approximately two gallons per minute. The internal dimensions of the filtering compartment 78 may be ¾" depth by 2 9/16" width by 7⅞" length. The pressure compartment 80 internal dimensions may be 1" depth by 3½" width by 7½" length. The openings 90, 92 and 94 may be of 27/32" I.D. The pin carrying plate 84 may carry 111 pins 82, ⅞" long with a .093" diameter, in 9 rows of 7 pins and 8 alternating and staggered rows of 6 pins. The pins and rows may be at ⅜" spacing to form a block of 111 pins being 2¼" by 6". The perforate plate 76 may have 111 openings 88 spaced in a manner similar to the pin spacings. The openings 88 may be of .109" diameter which when circumscribing the respective pins 82 provides for a close tolerance fit of .008". The upper casing portion 70, lower casing portion 72, and the perforate plate 76 may be all formed from 1/16" Lucite. This form of the lint filter assembly has been found to give both good filtering and self-cleaning results. This is however but one form of which the present invention may take.

The operation of the lint filter assembly 58 and a circulation system in which the assembly may be used will now be explained in detail. During a wash cycle in the operation of the clothes washer 10, the reversible motor 28 will cause the reversible pump 50 to operate in a direction to force recirculation flow from the filter inlet fitting 62 to the two-way valve 64 and then through conduit 60 to the filter assembly 58 where lint and the like are removed from the recirculation water flow in the filtering compartment 78 by becoming impaled on the pins 82. The recirculation flow then continues through conduit 56, through the reversible pump 50, then past the pressure tap 98 and through conduit 54 to the water container outlet 48. Since there is a common water level between the perforated spin tub 20 and the water container 18 and since the lint filter inlet fitting 62 is on the opposite side of the water container from the water container outlet 48, the water recirculation path is continued by flow through the spin tub 20. Since the filtering compartment 78 is on the low pressure side of the recirculation system and the pressure compartment 80 is connected to the high pressure side of the pump 50 by means of the pressure tap 98, there is a pressure differential across the diaphragm 86 creating a force to maintain the pins 82 and the pin carrying plate 84 in a first or filtering position shown in FIGURE 1. It is the pins 82 extending through the perforate plate 76 into the filtering compartment 78 while in this filtering position that creates a filter for impeding the passage of lint or the like in the recirculation flow without impeding the flow. The lint or the like is thus retained on the pins 82.

During the spin cycle of the clothes washer 10, the motor 28 and thus the reversible pump 50 is reversed to create a drainout flow from the water container 18 through the water container outlet 48, conduit 54, pump 50, conduit 56, the filtering compartment 78, conduit 60 and then the two-way valve 64 to a drain line 66. During this reverse or drainout flow it is noted that the pressure tap 98 is now on the low pressure side of the pump while the lint filtering compartment 78 is now on the high pressure side of the pump. This creates a pressure differential opposite of the original pressure differential and effects a movement of the pins 82 into a retracted position in the pressure compartment 80. During the movement of the pins 82 to the retraction position, each opening 88 of the perforated plate 76 cooperates with the pin 82 associated therewith to strip lint and the like therefrom and thus leave the lint and other foreign matter in the filtering compartment 78 as mentioned above. Since the pins are in a retracted position and there is drainout flow through the filtering compartment 78, the lint and the like are flushed or backwashed from the compartment 78 to the drain line 66. It is to be noted that the retraction of the pins 82 not only creates a mechanical stripping action of the lint and the like from the filtering elements but, by removing all obstacles in the flow path, decreases resistance to flushing flow in the filtering compartment 78.

It should now be seen that an improved lint filter assembly has been provided for a washing apparatus having fluid flow in recirculation and drain directions and in which the lint filter assembly is responsive to said flow directions to effect either filtering or flushing of lint.

While the embodiment of the present invention as herein disclosed constitutes a preferred form it is to be understood that other forms might be adopted.

What is claimed is as follows:

1. A filter comprising an outer casing, a rigid perforate member dividing said casing into at least a first compartment and a second compartment, said first compartment forming a fluid conduit, a plurality of pins in a first position extendable respectively through perforations in said perforate member into said first compartment and retractable through said perforations to a second position in said second compartment, said pins having close tolerance fit in relation to said perforations, whereby the pins in said first position are adapted to strain foreign matter in fluid flow through said first compartment, the foreign matter strained being stripped from said pins by said perforate member as said pins are retracted to said second position.

2. A filter comprising an outer casing, a rigid perforate member dividing said casing into at least a first compartment and a second compartment, said first compartment forming a fluid conduit, a plurality of pins in a first position extendable respectively through perforations in said perforate member into said first compartment to strain foreign matter in fluid flow through said first compartment and retractable through said perforations to a second position in said second compartment, each of said pins having a close tolerance fit in relation to its respective perforation, whereby the foreign matter strained is stripped from said pins by said perforate member as said pins are retracted to said second position, and the foreign matter stripped adapted to be flushed from said first compartment by further fluid flow when said pins are in said second position.

3. The filter of claim 2 wherein said close tolerance fit is substantially .008".

4. A filter in combination with bidirectional fluid flow means, said filter comprising an outer casing having a plurality of openings, a rigid perforate member dividing said outer casing into at least a first and a second compartment, said first compartment being in fluid flow communication through some of said openings with said bidirectional fluid flow means, a plurality of pins extendable respectively through closely fitting perforations in said perforate member and movable between first and second positions, said pins in said first position extending through said perforations into said first compartment, said pins in said second position retracting through said perforations into said second compartment, whereby said pins in said first position strain foreign matter when said bidirectional fluid flow means provides fluid flow in one direction, the foreign matter strained being stripped from said pins as said pins retract into said second position and being adapted thereby to be flushed from said first compartment when said bidirectional fluid flow means provides fluid flow in the reverse direction.

5. A filter in combination with a bidirectional fluid flow means, said filter comprising an outer casing having a plurality of openings respectively connected with said fluid flow means and said signal means, a rigid perforate plate having a plurality of spaced perforations and dividing said outer casing into at least a first and a second compartment, said first compartment being in fluid flow communication with said bidirectional flow path, a diaphragm located in said second compartment and movable between a first and a second position by a pressure change in said fluid flow means, a plurality of pins carried by said diaphragm and extended respectively through said perforations of said perforate plate, each of said pins having a close tolerance fit with one of said perforate plate openings, said pins being inserted through said perforate plate perforations into said first compartment when said diaphragm is in said first position, said pins retracting through said perforations into said second compartment when said diaphragm is in said second position, whereby said pins in said first position strain foreign matter in said flow path during flow in one direction, the foreign matter strained being stripped from said pins by said perforations of said perforate plate as said pins retract into said second position and being adapted thereby to be flushed from said first compartment when said bidirectional fluid flow means provide fluid flow in the reverse direction.

6. A lint filter in combination with recirculative water flow means for a clothes washer including a washing tub; said water flow means including a bidirectional pump forcing recirculative water flow through the washing tub during one mode of operation and reverse drain-out flow during another mode of operation, and a pressure tap located on the high pressure side of said pump during said first mode of operation; said lint filter comprising an outer casing having a plurality of openings, a rigid perforate plate having a plurality of spaced perforations and dividing said outer casing into at least a first and a second compartment, said first compartment being in fluid flow communication with said recirculative water flow system through some of said openings, a diaphragm located in said second compartment and responsive to pressure in said pressure tap to move from a second position to a first position, a plurality of pins carried by said diaphragm and extended respectively through said spaced perforations of said perforate plate, each of said pins having a close tolerance fit respectively with one of said perforate plate perforations, said pins extending through said perforate plate perforations into said first compartment when said diaphragm is in said first position, said pins retracting into said second compartment when said diaphragm is in said second position, whereby said pins in said first position strain lint in said flow means during said recirculative flow, the lint strained being stripped from said pins by said perforate plate perforations as said pins retract into said second position and being adapted thereby to be flushed from said lint filter by said reverse drain-out flow.

References Cited

UNITED STATES PATENTS

| | | | |
|---|---|---|---|
| 2,555,725 | 6/1951 | Archbold | 210—407 X |
| 3,102,858 | 9/1963 | Orton | 210—143 X |
| 3,219,192 | 11/1965 | Trembath et al. | 210—167 X |
| 3,305,093 | 2/1967 | Brubaker et al. | 210—167 X |
| 3,332,259 | 7/1967 | Zylstra | 210—167 X |

SAMIH N. ZAHARNA, Primary Examiner

U.S. Cl. X.R.

210—167. 411